United States Patent Office 2,784,099
Patented Mar. 5, 1957

2,784,099

PUDDING COMPOSITION

Harry W. Block, Orange, and James Lincoln Common, Rutherford, N. J., and John F. Dreher, New York, N. Y., assignors to General Foods Corporation, White Plains, N. Y., a corporation of Delaware No Drawing. Application January 3, 1955, Serial No. 479,676

15 Claims. (Cl. 99—139)

This invention relates to milk pudding compositions and more particularly to milk gels of the type resulting from the combination of low methoxyl pectin with milk. It still more particularly relates to food preparations of low caloric valve for dietetic use and which advantageously have many of the characteristics of puddings prepared from starch.

The use of low methoxyl pectin in preparing gels through precipitation of the pectinate by polyvalent metal ions such as calcium, magnesium, and the like, is well known. This particular gel formation has been employed in the case of milk which serves as an edible liquid supplying the calcium for preparation of a milk gel. In such milk gels there usually results undesirable lumping and curdling stemming from too great an availability of the polyvalent metal ions which induces rapid set and occasions an undesirable texture and appearance in the final food product. The use of salts such as potassium, sodium and other alkali metal salts to retard the rate of set and produce the desired texture for the pectinate gel formation thereby avoiding the aforementioned undesirable features is likewise well known. In addition, such alkali salts have been employed to increase the stability of the low methoxyl pectin gels against syneresis wherein the gels are somewhat fragile as evidenced by breaks through which exudes liquid resulting in an unattractive and unstable appearance.

The aforementioned low methoxyl pectin-milk gel formation is characterized by a custard-like, readily deformable, fragile gel with lack of fullness of taste in the mouth. It would be desirable to produce a pudding distinct from such custard-like gels and approaching in appearance and texture the properties of a so-called starch base pudding. This may be accomplished by employing other thickening agents such as starch or vegetable gums. In the case of starch, however, there is a high caloric value in the eventual food product such that for consumers requiring dietetic control such a pudding is not practical. Vegetable gums, on the other hand, generally produce a non-uniformity in the gel formation in that when used in combination with low methoxyl pectin they are not readily dispersible therein and form an apparently incompatible mixture with the pectinate gel. This is evidenced by isolated gel particles and a discontinuous texture in the pudding. Consequently, it has been found preferable not to employ vegetable gums in the same liquid vehicle as low methoxyl pectin with the result that provision of a commercially acceptable low caloric pudding product has been difficult.

It has now been discovered that a low calorie milk pudding composition can be produced by combining low methoxyl pectin and an extract of Irish moss, preferably a refined water-soluble extract of the raw moss. A desired smooth, starch-like pudding texture is accomplished by employing a small quantity of an alkali ion, preferably in the form of an edible alkali salt such as a potassium salt or salts. The alkali salt appears to have a twofold function in the present pudding. In the first place, potassium and ammonium cations have a gel-inducing effect on this Irish moss extract or sea plant gelose which permits relatively small proportions of the extract to be employed to provide the desired thickened texture resembling a starch pudding. Secondly, alkali salts of relatively weak organic acids, such as citric, lactic, tartaric, malic, and even acetic acid or generally any alkali salt of a food acid produce a dessert product of markedly improved texture.

The result is a novel starch-like pudding composition low in caloric value and unlike other low methoxyl pectin-milk preparations in that the pudding is free of any grainy or curdled appearance. Unexpectedly, the Irish moss gell is distributed throughout the milk gel so as not to be discernible from the pectinate complexes formed therein. The reason for this phenomenon is somewhat obscure; one explanation advanced is that alkali salts of a food acid, e. g., potassium or sodium citrate, substantially retard the formation of the pectin-milk gel until the Irish moss extract-salt complex is completely admixed therein. This provides the stable and smooth appearance characteristic of the present starch-like pudding. In any event, the more preferred pudding composition of the present invention results from the use of an Irish moss extract enhanced by potassium or ammonium chloride, iodide or sulfate salts in combination with potassium or sodium texture-improving food acid salt. Salts in the former class, e. g., potassium chloride, produce Irish moss extract gels of higher strength than salts in the latter class, e. g., potassium citrate, having the same cation content. For this reason it is preferred to use both classes of salts to provide optimal gel strength and thickness as well as uniformity of texture, the most preferred salts of the respective classes being potassium chloride and potassium citrate, and the last preferred being the sodium salt of the former class and the acetates of the latter class. However, it is not intended to foreclose the use of a single salt of a food acid, for example, potassium citrate, to provide the desired characteristics common to both salts inasmuch as the improved dessert product of the present invention is obtained essentially from monovalent, i. e., alkali, cations improving the desired gelation of the Irish moss extract while food acid salts of these cations have the desired texture-improving function. Increased levels of potassium citrate would conceivably satisfy both desired requisites for the pudding. For this reason the addition to the low methoxyl pectin and Irish moss extract is referred to broadly in the accompanying claims as an alkali ion and an alkali salt of a food acid for enhancing the gelling properties of said extract and promoting uniform dispersion of the pectin and the extract in the pudding, realizing that for the purposes of the present invention a food acid may be broadly interpreted as including some inorganic acids as well as the usual weak organic acids.

The low methoxyl pectins employed in this invention are those which have now become well defined in the art as including a relatively low methoxyl content in the order of from 2-7% and generally not exceeding 10% or 11% of the overall molecular weight of the pectin. The esterification of the pectin molecule may also be expressed as degree of methoxylation, that is, the percent of methoxyl groups ($CH_3O$) to the total number of both carboxyl and methoxyl groups on the galacturonide chain. The preferred degree of methoxylation for the low methoxyl pectin is in the order of 12-43%. Thus, the term low methoxyl pectin is used herein to describe any product derived from pectin wherein a majority of the carbomethoxy groups ($-COOCH_3$) have been de-esterified to carboxyl groups ($-COOH$). The pectin molecule may have substituted thereon other groups such as amides depending upon the deesterifying process employed. Such groups change the measured degree of demethoxylation when expressed by the equivalent combining weight of the pectin. However, the gelling characteristics of the pectin used according to the present invention are substantially dependent upon the methoxyl content or degree of demethoxylation of the pectin and the availability of the polyvalent metal ions supplied by the milk, to wit, calcium.

It is well recognized that the manner of preparation, isolation and neutralization of such low methoxyl pectin varies depending upon whether an acidic, alkali or enzyme demethoxylation technique is employed and anyone skilled in the art will be capable of modifying such techniques to provide the necessary calcium sensitivity, viscosity and gel strength for a milk pudding. For example, it is generally accepted that acid treatment to deesterify pectic substances such as apple or citrus products produces a low methoxyl pectin having low calcium sensitivity and high viscosity, whereas, enzyme treatment produces a pectinate having high calcium sensitivity and low viscosity. For the purposes of the present invention we have found that an acid amide of pectinic acid produced by California Fruit Growers Exchange and described in U. S. Patent No. 2,480,710 to Bryant is acceptable; this pectin has a more or less intermediate degree of calcium sensitivity and viscosity.

The Irish moss extracts as indicated previously are preferably refined, hot-water-soluble extracts of the raw moss. The Irish moss can be classified generally as sea plant geloses obtained from moss or seaweeds like *Chrondrus crispus* of the Gigartinaceae genus. The Irish moss extract includes sufficiently anionically charged material, i. e., the carragheenin sol or colloid of Irish moss, to provide the desired gelling potential when cations like potassium and ammonium are introduced therein. In this connection the dried hot-water-soluble extract of the Irish moss may be physically mixed with a potassium or ammonium chloride, iodide, sulfate, phosphate or like salt. The level of the salt employed for enhancing the gelling properties of the Irish moss extract may have a ratio in the order of a fraction of 1% to 25% by weight of the extract depending upon the concentration of the dry mix ingredients in the ultimate product. Generally where concentration of the Irish moss extract in the dessert product is low, the level of the potassium or ammonium salt should be higher. At high concentrations of the extract the salt level should be lower.

Alternatively, the Irish moss extract may be combined with the desired salt to form a complex prior to admixture with the other ingredients of the dry mix. This complex may be formed according to the methods described in U. S. Patent No. 2,427,594 to Alexander Frieden et al., September 16, 1947.

An Irish moss extract-potassium chloride combination having a viscosity of between 30 and 70 N on the McMichael viscosimeter is preferred; and it has been found that a gel having a strength of between 110-130 gms. provides the desired starch-like body to the pudding composition. This measure of gel strength signifies the weight required to break a water gel containing 10 gms. of the extract-salt complex in 500 ml. of solution.

As explained previously, the alkali salt of the food acid, e. g., potassium citrate or sodium citrate, apparently has a function additional to that of the extract-enhancing salt. Puddings prepared using potassium citrate or sodium citrate result in desserts having the Irish moss and pectin gels uniformly distributed. Salts of inorganic acids such as potassium phosphate, potassium sulfate and ammonium phosphate generally produce a pudding having a less desirable appearance. Alkali salts of simple organic acids such as lactates, malates, tartrates and acetates have been found to produce puddings similar to those resulting from employment of potassium or sodium citrate.

For dietetic purposes it is frequently desirable to employ one or more artificial sweeteners among which are saccharin and cyclamates such as sodium or calcium cyclamate. Saccharin has the advantage of being relatively inexpensive; however, when used in high levels it develops a metallic taste. Calcium and sodium cyclamates, i. e., salts of N-cyclohexyl sulphamic acid described in U. S. Patent No. 2,275,125 to Audrieth et al., March 3, 1942, on the other hand, are more expensive than saccharin, are not as sweet, and excessive levels of cyclamate also produce a bitter taste. However, a combination of the saccharin and calcium or sodium cyclamate produces a greater sweetening effect free of any off-taste provided by either saccharin or the cyclamates alone. For the purposes of this invention it is preferred to use a combination of saccharin and sodium cyclamate so as to reduce the number of calcium ions present. If calcium cyclamate were employed, undesirable amounts of calcium pectinate formed might impair proper gel formation especially where low methoxyl pectins of relatively high calcium sensitivity are employed. It is not intended, however, to foreclose possible use of calcium cyclamate as a sweetener, since by reducing the calcium sensitivity of the low methoxyl pectin such a sweetener can be practically employed.

Generally the relative proportions of the saccharin and the cyclamate should be such that the cyclamate level is substantially higher than that of the saccharin. The concentration of the saccharin may be reduced down to the order of a fraction of a percent of the cyclamate. The ratio between the cyclamate and the saccharin preferably should be in the order of 2 to 4 parts by weight of cyclamate to one part by weight of saccharin, although these levels will be adjusted as the sweetness intensity required for variously flavored pudding changes.

Moreover, although for dietetic purposes sweeteners like saccharin and cyclamates are preferred, other sweeteners may also be employed and, indeed, dextrose and sucrose may also be used as sweetening ingredients for the pudding where dietetic considerations are not involved.

Thus, the ingredients of the mix for the present pudding preferably include a low methoxyl pectin, an Irish moss extract-alkali salt complex, an alkali salt of a food acid, and, in a dietetic pudding, a substantially non-caloric artificial sweetener, together with suitable flavoring and color such as vanilla and butterscotch. These ingredients may be provided in the form of a dry mix to be dissolved in fresh liquid whole or skim milk or may be combined with a dry milk powder such as a spray dried or drum dried whole or skim milk capable of being reconstituted with water. Generally, fresh liquid whole milk provides the strongest gel, whereas, reconstituted skim milk gives the weakest gel; fresh liquid skim milk, evaporated milk and whole milk powder give gels of intermediate strength.

It has been found that in preparing a pudding from mixes not having the potassium citrate and like salts a slight hold-up period should be employed after the mix solution is cooked, otherwise the resulting pudding is likely to curdle. This phenomenon is advantageously avoided, however, by generally employing the aforementioned alkali salts of simple organic acids, e. g., potassium citrate, as will be noted from the following experiments.

A mix employing 2.604 gms. low methoxyl pectin, 1.402 gms. Irish moss extract-KCl complex, .100 gm. saccharin, .350 gm. sodium cyclamate, .016 gm. vanilla flavor, .012 gm. vanilla color and 15.516 gms. of filler was dissolved in 2 cups of milk and brought to a boil. Puddings employing .25 gm. of added potassium citrate exhibited no trace of curdling when poured immediately as a hot solution into the bowl or when allowed to cool for a period of about 2 minutes prior to pouring into the bowl. On the other hand, mixes not employing potassium citrate were found to show curdling in all instances of preparation. These effects were also observed for other alkali salts of simple organic acids, for example, potassium and ammonium salts of acetic, lactic, tartaric and malic acids, when said salts were substituted in an equivalent weight basis for the potassium, although the most preferred pudding texture resulted from employment of potassium citrate in the level indicated. Generally, increasing the level of potassium citrate above .5 gm. in the aforementioned experiment also produced some curdling such that optimal puddings appearance resulted when the potassium citrate was employed at levels in the neighborhood of .25 gm. or 1.25% by weight of the dry mix.

It has been found preferable to employ the invention as a dry mix for admixture with fresh whole milk, the low methoxyl pectin being employed at 10 to 14 parts by weight compared with 4 to 8 parts by weight of an Irish moss extract-potassium chloride complex, an alkali salt of a simple organic acid being included in an amount equivalent to that amount of alkali present in 1 to 2 parts by weight of potassium citrate.

The following are typically flavored mixes:

Example 1

| | Gms./pkg. |
|---|---|
| Low methoxyl pectin | 1.3 |
| Irish moss extract-KCl complex | .7 |
| Potassium citrate | .25 |
| Sodium cyclamate | .17 |
| Butterscotch flavor | .08 |
| Saccharin | .05 |

Example 2

| | Gms./pkg. |
|---|---|
| Low methoxyl pectin | 1.3 |
| Irish moss extract-salt complex | .7 |
| Potassium citrate monohydrate | .25 |
| Sodium cyclamate | .17 |
| Saccharin | .05 |
| Vanilla flavor | .01 |

A pudding is prepared from the above mixes by addition thereof to 1 to 1¼ cups of fresh liquid whole or skim milk. The powder of the mix is added to the milk with constant stirring and when completely dispersed therein the mixture is brought to a boil with constant stirring. Thereafter, the cooked pudding may be poured into a bowl or sherbet glass and will set on cooling to room temperature.

A thin boiling starch or other suitable filler such as mannitol and sorbitol may be included in the mixes to provide bulk and promote uniform distribution of the mix ingredients as they are poured into the milk. By a "thin boiling starch" is meant a modified potato, corn or like starch which when heated in an aqueous solution to boiling has a fluidity approximating that of water. Fillers like mannitol and sorbitol although as high as a thin boiling starch in available carbohydrate, are not substantially digested in the human system and hence are not as fattening. But such hexatols are less preferred by reason of their relatively higher cost. A starch filler such as a thin boiling potato or cornstarch, on the other hand, provides the desired bulk without appreciably increasing caloric value in the pudding. The resulting dessert product has a uniform smooth texture and the fullness of taste of a starch base pudding but without the caloric value thereof. Thus, a dry dietetic pudding mix in accordance with the present invention and producing an equal number of servings compared to a conventional cornstarch pudding includes about 27 calories for a 10 gm. mix as compared with 178 calories provided by 46.1 gms. of a cornstarch pudding mix which includes about 25 gms. of cornstarch. Generally the present dietetic puddings when compared with regular cornstarch puddings represented a caloric reduction in the order of 59% when skim milk was used and 52% when whole milk was used.

It will be understood that while the invention has been described in part by means of specific examples reference should be had to the appended claims for a definition of the scope of the invention.

What is claimed is:

1. A pudding composition capable of forming a smooth starch-like milk pudding comprising low methoxy pectin, an Irish moss extract and an alkali ion for enhancing the gelling properties of said pudding.

2. A pudding composition capable of forming a smooth starch-like milk pudding comprising low methoxy pectin, an Irish moss extract and an alkali salt of a food acid for enhancing the gelling properties of said extract and promoting uniform dispersion of said pectin and said extract in the pudding.

3. A pudding composition capable of forming a smooth starch-like milk pudding comprising low methoxy pectin, an Irish moss extract and a potassium salt for enhancing the gelling properties of said pudding.

4. A pudding composition capable of forming a smooth starch-like milk pudding comprising low methoxy pectin, an Irish moss extract and a potassium salt of a food acid for enhancing the gelling properties of said extract and promoting uniform dispersion of said pectin and said extract.

5. A pudding composition capable of forming a smooth starch-like milk pudding comprising low methoxyl pectin, an Irish moss extract and an ammonium salt for enhancing the gelling properties of said pudding.

6. A pudding composition capable of forming a smooth starch-like milk pudding comprising low methoxyl pectin, an Irish moss extract, an edible salt selected from the group consisting of potassium and ammonium salts of an inorganic acid for enhancing the gelling properties of said extract, and an edible salt of a food acid selected from the group consisting of potassium and sodium salts of food acids for promoting uniform dispersion of said pectin and said extract in the pudding.

7. A pudding composition according to claim 6 wherein said food acid is selected from the group consisting of citric, malic, tartaric and acetic acid.

8. A pudding composition capable of forming a smooth starch-like milk pudding comprising pectin having a methoxyl content in excess of 2% and not exceeding 11%, an Irish moss extract, and an alkali ion for enhancing the gelling properties of said pudding.

9. A pudding composition according to claim 8 wherein the pectin has a methoxyl content of from 2–7%.

10. A dietetic pudding composition capable of forming a smooth starch-like milk pudding comprising low methoxyl pectin, an Irish moss extract, an alkali ion for enhancing the gelling properties of said pudding, and an artificial sweetening agent.

11. A dietetic pudding powder according to claim 10 wherein the artificial sweetening agent includes saccharin and a cyclamate.

12. A dietetic pudding composition according to claim 10 wherein the artificial sweetening agent includes saccharin and sodium cyclamate.

13. A pudding composition capable of forming a smooth starch-like milk pudding comprising low methoxyl pectin, an Irish moss extract, potassium chloride for enhancing the gelling properties of said extract, and an edible salt selected from the group consisting of potassium and sodium salts of a food acid for promoting uniform dispersion of said pectin and said extract in the pudding.

14. A pudding composition according to claim 13 wherein the pectin has a methoxyl content of from 2–11% and the dry pudding mix comprises 10–14 parts by weight of low methoxyl pectin, 4–8 parts by weight of Irish moss extract, and the alkali ion of the food acid is included in an amount equivalent to that present in 1-2 parts by weight of potassium citrate.

15. A dietetic pudding composition according to claim 14 in which the dry pudding mix includes an artificial sweetening agent comprising 2-4 parts by weight of cyclamate to 1 part by weight of saccharin.

References Cited in the file of this patent

UNITED STATES PATENTS

| | | |
|---|---|---|
| 2,373,729 | Williaman | Apr. 17, 1945 |
| 2,466,146 | Baker | Apr. 5, 1949 |
| 2,485,043 | Gatti | Oct. 18, 1949 |
| 2,653,105 | Gordon | Sept. 22, 1953 |